Patented Mar. 27, 1934

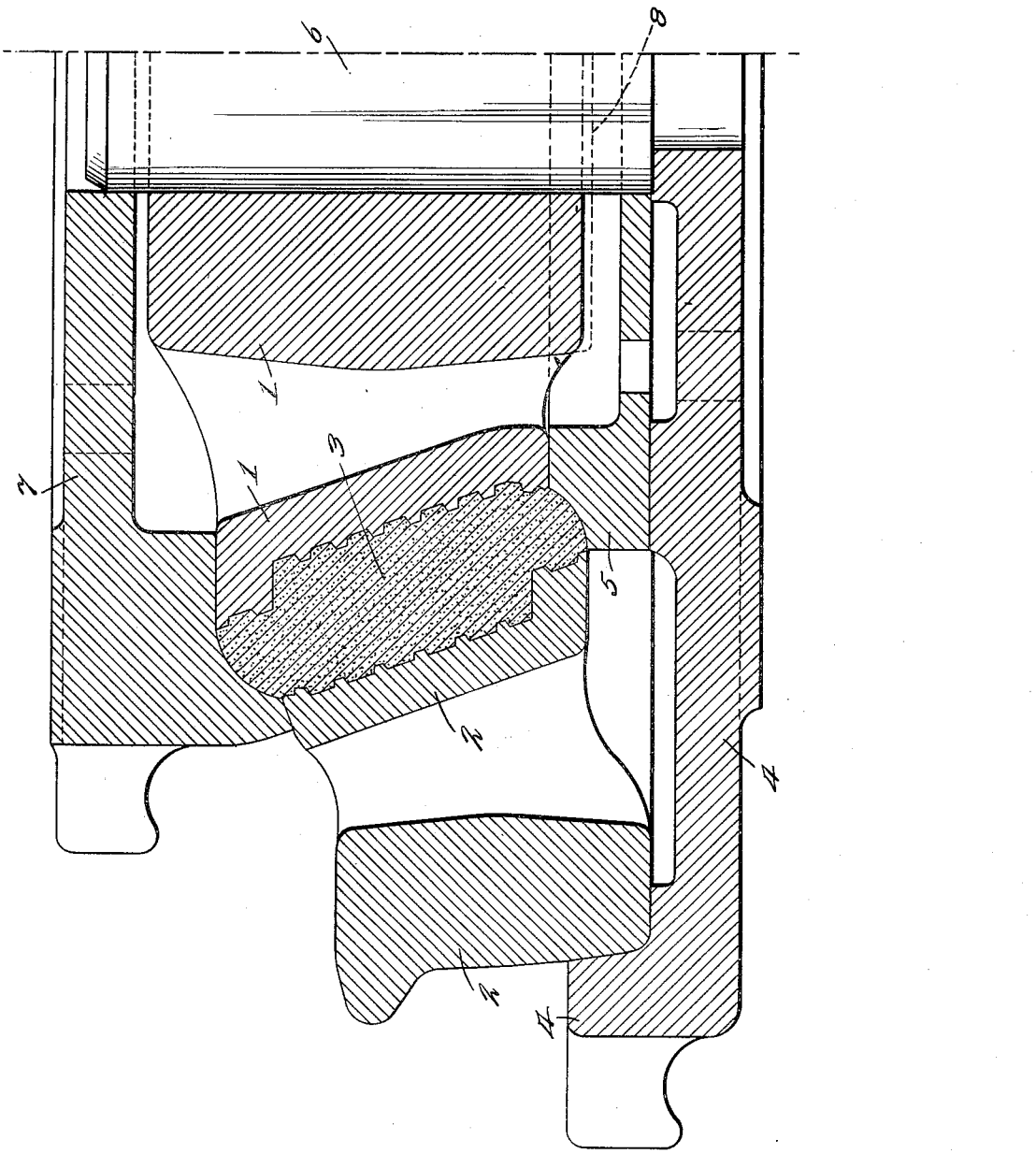

1,952,446

UNITED STATES PATENT OFFICE 1,952,446

METHOD OF MANUFACTURING ELASTIC TORQUE TRANSMITTING BODIES, PARTICULARLY ELASTIC WHEELS

Elov F. Maas, Cuyahoga Falls, Ohio, assignor to Wingfoot Corporation, Wilmington, Del., a corporation of Delaware Original application September 13, 1929, Serial No. 392,579. Divided and this application October 11, 1930, Serial No. 488,183

4 Claims. (Cl. 18—59)

This invention relates to improvements in the manufacture of elastic torque transmitting bodies, particularly elastic wheels of the kind described and claimed in my prior Patent No. 1,648,413, granted November 8, 1927, and of the type specified and covered in my application filed September 13, 1929 relating to improvements in elastic wheels and bearing Serial No. 392,579, of which the present application is a division.

While reference may be made to said patent and application, it may be briefly stated that the elastic wheel disclosed in said patent and application comprises a hub and rim portion both made of metal or other suitable material and a cushioning portion interposed between said hub and rim portion and forming a yieldable connection between said members. The hub and rim portion have outer and inner surfaces which are inclined to the plane of the wheel but substantially parallel to each other and on which outwardly and inwardly projecting members are respectively provided, said cushioning material being vulcanized to said outer and inner surfaces of the hub and rim portions.

An object of the present invention is to provide arrangements for overcoming the otherwise harmful effects of excessive shrinkage of the elastic material when it cools down after the vulcanizing operation.

Another object of the invention is to provide means which compensate for the diminution of the volume of said elastic material during the cooling operation by bringing the surfaces to which said cushioning material is vulcanized closer together.

Further objects of the invention will be more readily understood from the following description with reference to the accompanying drawing in which the figure illustrates a preferred embodiment of the invention.

Referring to the accompanying drawing, 1 designates in cross-section the hub portion, 2 the rim portion of a railroad wheel, and 3 designates the cushioning material vulcanized to said hub and rim portions.

During the curing operation rim member 2 of the wheel rests upon and is supported by the base plate 4 which engages both the lower surface and the peripheral surface of the rim member to properly hold the same in position. The hub member 1 rests upon and is supported at its outer portion by a plate 5 which in turn rests upon the base plate 4, both the hub member 1 and the plate 5 being centralized and held in proper position by a central shaft or rod 6 supported by the base plate 4. The rubber compound or other suitable elastic material 3 is suitably positioned between the outer surface of hub member 1 and the inner surface of the rim member 2, and a top plate 7 is positioned above the rim and hub members, resting thereon as shown in the accompanying drawing and being centralized by the rod or shaft 6. The several plates 4, 5 and 7 may be secured together in any suitable manner. The rubber compound or other material is then cured on to the rim or hub members in any suitable or usual way. After the curing operation is completed, the top plate 7 is removed, and also the plate 5 is removed, and this plate 5 may be substituted by another plate of less height or thickness. Then while the wheel is cooling down, pressure is applied to the hub member 1, and the downward movement may be limited or determined by the plate which is substituted for the plate 5. The amount of downward movement is, for example, indicated by the dotted line 8 in the accompanying drawing. This downward movement of the hub member 1 relatively to the rim member 2, due to the inclination or conical arrangement of the surfaces of said members, causes a compression of the rubber compound or other material and a diminution of its volume, and the amount of compression and diminution of volume is calculated or determined to be such as to offset the excessive shrinkage of the rubber compound over that of the metal of the hub and rim members. Thus, when the wheel is made and in its cold state, the elastic cushion between the hub and rim members is free from initial strains, and the maximum strength where the rubber compound is united to the metal parts is obtained.

While the invention has been described in connection with a railroad wheel, it will be understood that the invention is not limited to a special type of wheel but may be used for other types of wheels and gears or other resilient power transmitting bodies.

I claim:—

1. The method of making an elastic wheel, comprising assembling in coaxial relation a hub member and a rim member having outer and inner surfaces similarly inclined with respect to the plane of the wheel, introducing elastic cushioning material between said outer and inner surfaces of the hub and rim members, curing said elastic material on to the surfaces of said members under the influence of heat, and cooling said members and material while effecting relative displacement of said members in a direction to bring said surfaces closer together and to cause compression and diminution of volume of said material such as to compensate for the excessive shrinkage thereof over that of said rim and hub members.

2. The method of making an elastic wheel, comprising assembling in coaxial relation a hub member and a rim member having their outer and inner surfaces similarly inclined with respect to the plane of the wheel, introducing elastic cushioning material between said outer and inner surfaces, curing said elastic material on to the surfaces of said members under the influence of heat, and cooling said members and material while applying pressure to said hub member in a direction to bring said surfaces closer together to cause compression and diminution of volume of said material such as to compensate for the excessive shrinkage thereof over that of said hub and rim members.

3. The method of curing elastic material between and on to the surfaces of a pair of annular members, which comprises forming similarly inclined inner and outer surfaces on said members respectively, assembling said members in coaxial relation with said surfaces in spaced relation and in substantial parallelism, introducing elastic material between said inner and outer inclined surfaces of said members, curing said elastic material on to the surfaces of said members under the influence of heat, and cooling said members and material while effecting relative displacement of said members in a direction to bring said surfaces closer together to subject said material to compression and diminution of volume such as to compensate for the excessive shrinkage of said material over that of said members.

4. The method of curing elastic material on to and between a pair of members, which comprises forming similarly inclined surfaces on said members, assembling said members with said surfaces in spaced and substantially parallel relation, introducing elastic material into the space between said inclined surfaces, curing said elastic material on to said surfaces under the influence of heat, and cooling said members and material while effecting relative displacement of said members in a direction to bring said surfaces closer together to cause compression and diminution of volume of said material such as to compensate for the excessive shrinkage of said material over that of said members.

ELOV F. MAAS.